A. P. PFEIL AND F. H. BAUM.
PORTABLE BAKING HEARTH EQUIPMENT.
APPLICATION FILED SEPT. 22, 1919.
1,362,178. Patented Dec. 14, 1920.
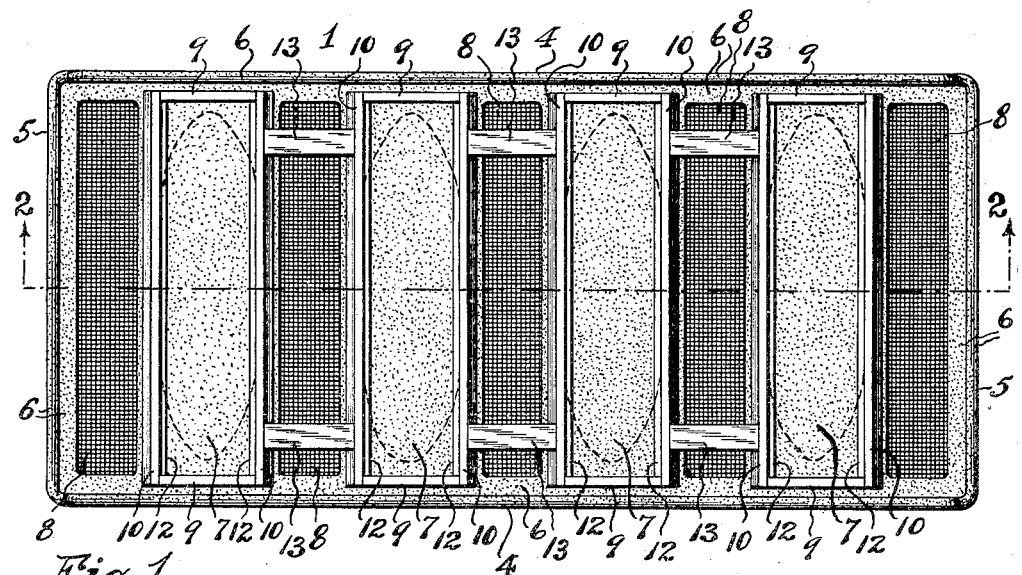
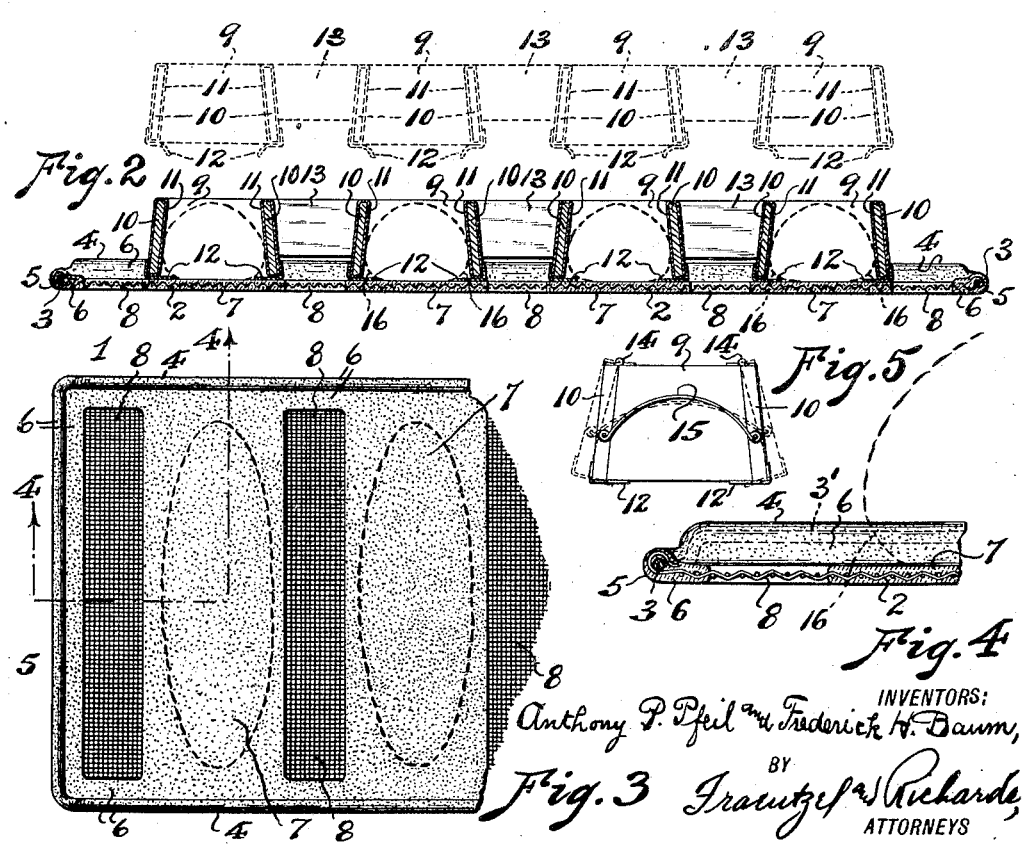

UNITED STATES PATENT OFFICE.

ANTHONY P. PFEIL, OF EAST ORANGE, AND FREDERICK H. BAUM, OF JERSEY CITY, NEW JERSEY.

PORTABLE-BAKING-HEARTH EQUIPMENT.

1,362,178.  Specification of Letters Patent.  Patented Dec. 14, 1920.

Application filed September 22, 1919. Serial No. 325,326.

*To all whom it may concern:*

Be it known that we, ANTHONY P. PFEIL and FREDERICK H. BAUM, citizens of the United States, residing at East Orange, in the county of Essex and State of New Jersey, and Jersey City, county of Hudson and State of New Jersey, respectively, have invented certain new and useful Improvements in Portable-Baking-Hearth Equipments; and we do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention has reference, generally, to improvements in baking apparatus; and the invention relates, more particularly, to a novel construction of portable hearth upon which hard or full crusted bread, rolls, etc., may be baked.

The invention has for its principal object to provide a novel construction of portable hearth upon which the dough may be deposited to undergo the proofing or curing and baking processes, said portable hearth being designed to permit the handling of the same to carry on said processes with the same facility and dispatch and in the same manner as is usual in connection with the baking of pan bread.

A further object of the present invention is to provide a novel construction of portable hearth constructed to support the dough while baking in exactly the same manner as if deposited directly upon the fixed hearth of an oven, the construction of the novel portable hearth being such that heat radiated from the fixed hearth of the oven may pass easily and directly to and around the dough; and, furthermore, the construction of the novel portable hearth being such that bread baked thereon has identically the same appearance, shape and fullness of crust as does similar bread baked directly upon the fixed hearth of an oven.

The novel portable hearth constituting our present invention has the further advantage of being adapted to be used to bake hearth bread or full crusted bread in continuous automatic ovens of modern type.

Another object of our present invention is to provide in connection with the novel portable hearth a novel construction of removable proofing frame for holding the dough against distortion while undergoing the process of proofing or curing.

Other objects of the present invention, not at this time more particularly enumerated, will be clearly understood from the following detailed description of the same.

With the various objects of the present invention in view, the same consists, primarily, in the novel construction of portable hearth and removable proofing frame therefor hereinafter set forth, and the invention consists, furthermore, in the novel arrangements and combinations of the various devices and parts thereof, as well as in the details of the construction of the same, all of which will be hereinafter more fully described, and then finally embodied in the appended claims.

The invention is clearly illustrated in the accompanying drawings, in which:—

Figure 1 is a plan view of the novel construction of portable hearth with the removable proofing frame operatively arranged therewith, the position of the dough being indicated in dotted outline.

Fig. 2 is a longitudinal vertical section of the same, taken on line 2—2 in said Fig. 1, and illustrating in dotted outline the manner of lifting away the proofing frame after the dough has been proofed or cured, and is ready to be deposited in the oven upon said portable hearth.

Fig. 3 is a fragmentary plan view of the portable hearth with the proofing frame removed, in the position of the dough thereon being illustrated in dotted outline.

Fig. 4 is a detail vertical longitudinal section, taken on line 4—4 in said Fig. 3, the same being drawn on an enlarged scale.

Fig. 5 is a detail end view of a modified form of single proofing frame having movable side walls.

Similar characters of reference are employed in all of the hereinabove described views, to indicate corresponding parts.

Referring now to said drawings, the reference-character 1 indicates the complete portable hearth, which is preferably of rectangular shape, and comprises a flat body made of some suitable open mesh material 2, such, for example, as woven wire or its equivalent. The edges of said flat body are bound around a reinforcing or stiffening wire frame 3, the longitudinal sides 3' of which are upwardly off-set, so that the longitudinal margins of said flat body may be turned upwardly to provide upstanding longitudinal flanges 4, while the ends or lateral edges of the flat mesh body remain substantially in the plane of said body, but provide rounded edges 5 where folded around the frame 3, so as to easily permit a baker's peel to be slipped endwise beneath the body, when it is desired to handle the portable hearths and deposit the same within an oven by means of such a peel. Said flat open mesh body 2 is coated around its framed marginal edges, including the flanges 4, with layers 6 of a clay like composition, such, for example, as a fire clay composition or cement, such material surrounding the covered portions of the mesh body and its reinforcing frame, so as to embed the latter therein. Said flat mesh body is coated at intervals with laterally extending strips or layers of said clay like composition, thus forming a plurality of flat dough supporting members 7, alternated with open mesh spaces 8, so that the latter spaces border each side of each dough supporting member 7. While we have shown in the drawings said dough supporting members 7 extending laterally across the body, we do not limit ourselves to such arrangement, since the same may be disposed in any desired manner of extension, such, for example, as diagonally or longitudinally of the said body.

As an adjunct to the novel construction of portable hearth, above described, we provide a novel removable proofing frame, which consists of a plurality of rectangular frame-sections open at their tops and bottoms, each comprising end walls 9 and side walls 10, the latter being connected with the former so as incline or flare outwardly toward the bottoms of said frame-sections and are of slightly greater width than are the top openings. The walls of said frame-sections are lined with a suitable fabric lining 11, such for example as canvas, the same, when floured readily resisting any tendency of the dough to adhere or stick to the frame-sections. Connected with the bottom edges of said side walls 10 of said frame-sections are flexible inwardly projecting longitudinal fabric flanges 12, preferably made of canvas. These flanges border the sides of the bottom openings of each frame-section. When said proofing frame is used with a portable hearth having a plurality of dough supporting members 7, the frame-sections thereof correspond in number to the number of such dough supporting members, and the frame-sections are tied together in a gang arrangement by means of intermediate connecting blocks 13, which serve not only to join the several frame-sections together, but also to space the same apart in a manner corresponding to the spaced relation of the dough supporting members 7 of the portable hearth with which the same are to be used.

We may modify the structure of said proofing frames, so as to render the sides 10 thereof capable of being spread apart at their bottom edges, thus rendering very easy the removal of the frame, at the proper time, from around the dough deposited upon the portable hearth. In such modified structure of frame, the side walls 10 are pivoted or hinged by hinges 14 to the upper ends of the end walls 9, so that the bottom edges of the side walls may be swung outwardly. An upwardly bowed straddling spring 15 secured by its ends to the lower end portions of said side walls 10, serves when in normal position to hold the latter closed, but when depressed or flattened out by downward pressure, tends to swing open the said side walls of the frame, all as shown in Fig. 5 of the drawings. This construction is adapted more particularly for single proofing frames, but the principles thereof may also be applied to the gang arrangement of proofing-frame. Also, if desired, only one side of the frame may be rendered movable, while the opposite side remains stationary, by fixing said opposite side immovably to the end walls.

The method of using our novel portable hearth, together with the proofing frame therefor, is as follows:—

First the portable hearth is arranged with the proofing frame deposited thereon, so that each frame-section of the latter registers over a dough supporting member of the hearth. The baker then takes the properly shaped or molded raw dough forms and deposits one upon each supporting member 7 of the hearth within a frame-section, all as shown in Fig. 1 of the drawings. The hearth being thus loaded, is ready to be deposited in the proofing or curing cabinet. The purpose of the proofing frame is to hold the dough forms against flattening down out of shape before thoroughly proofed or cured, or, in other words, until the dough forms begin to "rise." To this end also the fabric flanges 12 are interposed beneath the rounded sides of the dough forms and the surface of the supporting members of the hearth, so that if, the dough settles at the sides it cannot adhere to the supporting members of the hearth in a manner preventing the dough form from attaining the rounded "up-throw" or "lift" 16 of its sides relative to the bottom of the loaf, since, the flanges 12 being floured readily release the side portions of the bottom of the dough form, so that as the dough begins to "rise," it will readily lift into said desired rounded "up-throw." After the dough has been allowed to proof or cured whereby it "rises" to the proper degree, and consequently sets to the desired shape, the baker then removes the proofing frame by lifting the same upwardly away from the dough forms. This movement of the proofing frame is facilitated by reason of the fact that the sides of each frame-section flare or incline outwardly toward their bottom edges, and consequently there is no tendency of the dough to jam or bind in the frame-sections, as the latter are pulled upwardly; and, furthermore, since the flanges 12 are flexible, they readily bend downwardly and yield to pressure against the sides of the loaves, so as not to disturb the latter as the frame-sections are pulled away.

The proofing-frame being removed the baker then deposits the portable hearth with its load of proofed or cured dough forms in the oven, either by slipping a peel endwise beneath the hearth, and thus conveying the same into the oven, or by depositing the hearth in operative relation to the conveyer of a continuous oven, if the latter type of oven is used. When thus deposited in the oven, the heat immediately passes directly to and about the dough forms, both by direct transmission through the supporting members 7 of the bottoms of the same, and by freely passing through the open mesh spaces 8 to the sides of the same, thus subjecting the dough forms to the heat of the oven in exactly the same manner as though they were deposited directly upon the fixed oven hearth, consequently the dough bakes with the sides and top thereof directly exposed to the heat, in a manner assured of producing the desired full crusted character of hearth baked loaves, and at the same time since the dough supporting members 7 of the hearth are comprised of a clay like composition having the general surface characteristics of a fixed oven hearth, the bottom of the loaves when baked will have all the characteristic appearance of loaves baked directly on such a fixed oven hearth.

The proofing frames used as above described are most necessarily required when the dough forms are made of what is known as "slack" dough, but if the dough used is of a more homogeneous consistency, so that tendency to settle out of desired shape before completely cured is eliminated, then the use of such proofing frames may be dispensed with.

In the old fashioned method of baking hearth or full crusted bread, after the dough was formed or molded and had been cured, the baker would pick up one or more loaves on a peel, and by the aid of the latter deposit the same upon the hearth of the oven, and then after the loaves were baked, would remove the same from the oven by the use of the peel. These operations required considerable handling and occupied much time, and consequently hearth or full crusted bread was more expensive to produce, both from cost and labor standpoints, than was pan bread, which could be handled in groups or in pans providing a plurality of dough receptacles. And, furthermore, since the production of hearth or full crusted bread requires that the sides of the dough be subjected to direct heat, unimpeded by the sides of a pan-like structure, in order that the perfect full-crust characteristic of such bread might be attained, either single or group pan-like structures for baking such bread or rolls have not proven satisfactory, and consequently the advantages of quick group handling of the loaves afforded by such methods have not been heretofore completely available.

With our present invention, however, all the advantages of group handling of the loaves have been rendered completely available, and at the same time the baked loaves produced upon our novel portable hearth, which supports the dough on a surface similar to that of the fixed hearth of an oven, possess all the well known characteristic appearances and crust qualities of hearth or full crusted bread baked directly upon the fixed hearth of an oven; and since the novel portable hearth is capable of being moved about, without disturbing the relation of the dough thereto, with the same facility that group baking pans are handled, the same is readily capable of being utilized to bake hearth or full crusted bread in a continuous or traveling oven, the conveyer members of which easily receive the portable hearths, and by engaging the upstanding flanges 4 thereof, readily propel the same through such an oven while the baking period continues.

We claim:—

1. A portable baking hearth comprising a flat mesh body, a coating of clay like composition covering and embedding said flat mesh body to form a dough supporting surface.

2. A portable baking hearth comprising a flat mesh body, a coating of clay like composition covering and embedding portions of said mesh body to provide a plurality of dough supporting members bounded on each side by unobstructed open portions of said mesh body.

3. A portable baking hearth comprising a flat mesh body, a coating of clay like composition covering and embedding portions of said mesh body to provide a plurality of dough supporting members bounded on each side by unobstructed open portions of said mesh body, and a stiffening frame about which the marginal edges of said mesh body are bound.

4. A portable baking hearth comprising a flat mesh body, a coating of clay like composition covering and embedding portions of said mesh body to provide a plurality of dough supporting members bounded on each side by unobstructed open portions of said mesh body, a stiffening frame about which the marginal edges of said mesh body are bound, and the longitudinal margins of said framed mesh body being turned upwardly to provide upstanding longitudinal flanges.

5. A portable baking hearth comprising a flat mesh body, a coating of clay-like composition covering and embedding portions of said mesh body to provide a plurality of dough supporting members bounded on each side by unobstructed open portions of said mesh body, a stiffening frame about which the marginal edges of said mesh body are bound, the longitudinal margins of said framed mesh body being turned upwardly to provide upstanding longitudinal flanges and a coating of clay-like composition covering and embedding the framed edges and margins of said mesh body.

6. The combination with a portable baking hearth comprising a flat mesh body having a coating of clay-like composition covering and embedding said flat mesh body to form a dough supporting surface of a removable proofing frame, said proofing frame comprising a box-like inclosure open at its top and bottom sides.

7. A combination with a portable baking hearth comprising a flat mesh body having a coating of clay-like composition covering and embedding said flat mesh body to form a dough supporting surface of a removable proofing frame, said proofing frame comprising a box-like inclosure open at its top and bottom sides, and a lining of woven fabric upon the inner wall surfaces of said box-like inclosure.

8. A combination with a portable baking hearth comprising a flat mesh body having a coating of clay-like composition covering and embedding said flat mesh body to form a dough supporting surface of a removable proofing frame, said proofing frame comprising a box-like inclosure open at its top and bottom sides, a lining of woven fabric upon the inner wall surfaces of said box-like inclosure, said box-like inclosure having flexible longitudinal flanges projecting inwardly at the bottom thereof.

9. The combination with a portable baking hearth comprising a flat mesh body having a coating of clay-like composition covering and embedding portions of said mesh body to provide a plurality of dough supporting members bounded on each side by unobstructed open portions of said mesh body of a removable proofing frame, the latter comprising a plurality of rectangular frame-sections open at their top and bottom sides, and means for connecting together and spacing said frame-sections to register over said dough supporting members of said portable hearth.

10. The combination with a portable baking hearth comprising a flat mesh body having a coating of clay-like composition covering and embedding portions of said mesh body to provide a plurality of dough supporting members bounded on each side by unobstructed open portions of said mesh body of a removable proofing frame, the latter comprising a plurality of rectangular frame-sections open at their top and bottom sides, means for connecting together and spacing said frame-sections to register over said dough supporting members of said portable hearth, a lining of woven fabric upon the inner wall surfaces of each frame-section.

11. The combination with a portable baking hearth comprising a flat mesh body having a coating of clay-like composition covering and embedding portions of said mesh body to provide a plurality of dough supporting members bounded on each side by unobstructed open portions of said mesh body of a removable proofing frame, the latter comprising a plurality of rectangular frame-sections open at their top and bottom sides, means for connecting together and spacing said frame-sections to register over said dough supporting members of said portable hearth, a lining of woven fabric upon the inner wall surfaces of each frame-section, flexible longitudinal flanges connected with the bottom edges of the side walls of each frame-section to project inwardly therefrom.

12. The combination with a portable baking hearth comprising a flat mesh body having a coating of clay-like composition covering and embedding portions of said mesh body to provide a plurality of dough supporting members bounded on each side by unobstructed open portions of said mesh body of a removable proofing frame, the latter comprising a plurality of rectangular frame-sections open at their top and bottom sides, the side walls of each frame-section being inclined outwardly from the top to the bottom edges of the same, and means for connecting together and spacing said frame-sections to register over said dough supporting members of said portable hearth.

13. The combination with a portable baking hearth comprising a flat mesh body having a coating of clay-like composition covering and embedding portions of said mesh body to provide a plurality of dough supporting members bounded on each side by unobstructed open portions of said mesh body of a removable proofing frame, the latter comprising a plurality of rectangular frame-sections open at their top and bottom sides, the side walls of each frame-section being inclined outwardly from the top to the bottom edges of the same, means for connecting together and spacing said frame-sections to register over said dough supporting members of said portable hearth, a lining of woven fabric upon the inner wall surfaces of each frame-section.

14. The combination with a portable baking hearth comprising a flat mesh body having a coating of clay-like composition covering and embedding portions of said mesh body to provide a plurality of dough supporting members bounded on each side by unobstructed open portions of said mesh body of a removable proofing frame, the latter comprising a plurality of rectangular frame-sections open at their top and bottom sides, the sidewalls of each frame-section being inclined outwardly from the top to the bottom edges of the same, means for connecting together and spacing said frame-sections to register over said dough supporting members of said portable hearth, a lining of woven fabric upon the inner wall surfaces of each frame-section, flexible longitudinal flanges connected with the bottom edges of the side walls of each frame-section to project inwardly therefrom.

15. The combination with a portable baking hearth, comprising a flat mesh body, a stiffening frame about which the edges of said mesh body are bound, the longitudinal margins of said framed mesh body being turned upwardly to provide upstanding longitudinal flanges, a coating of clay-like composition covering and embedding the framed edges and margins of said mesh body, said coating of clay-like composition extending over portions of the flat area of said mesh body to provide a plurality of dough supporting members bounded on each side by unobstructed open portions of said mesh body, of a removable proofing frame, the latter comprising a plurality of rectangular frame-sections open at their top and bottom sides, the side walls of each frame-section being inclined outwardly from the top to the bottom edges of the same, and means for connecting together and spacing said frame-sections to register over said dough supporting members of said portable hearth.

16. The combination with a portable baking hearth, comprising a flat mesh body, a stiffening frame about which the edges of said mesh body are bound, the longitudinal margins of said framed mesh body being turned upwardly to provide upstanding longitudinal flanges, a coating of clay-like composition covering and embedding the framed edges and margins of said mesh body, said coating of clay-like composition extending over portions of the flat area of said mesh body to provide a plurality of dough supporting members bounded on each side by unobstructed open portions of said mesh body, a removable proofing frame, the latter comprising a plurality of rectangular frame-sections open at their top and bottom sides, the side walls of each frame-section being inclined outwardly from the top to the bottom edges of the same, means for connecting together and spacing said frame-sections to register over said dough supporting members of said portable hearth, a lining of woven fabric upon the inner wall surfaces of each frame-section.

17. The combination with a portable baking hearth, comprising a flat mesh body, a stiffening frame about which the edges of said mesh body are bound, the longitudinal margins of said framed mesh body being turned upwardly to provide upstanding longitudinal flanges, a coating of clay-like composition covering and embedding the framed edges and margins of said mesh body, said coating of clay-like composition extending over portions of the flat area of said mesh body to provide a plurality of dough supporting members bounded on each side by unobstructed open portions of said mesh body of a removable proofing frame, the latter comprising a plurality of rectangular frame-sections open at their top and bottom sides, the side walls of each frame-section being inclined outwardly from the top to the bottom edges of the same, means for connecting together and spacing said frame-sections to register over said dough supporting members of said portable hearth, a lining of woven fabric upon the inner wall surfaces of each frame-section, flexible longitudinal flanges connected with the bottom edges of the side walls of each frame-section to project inwardly therefrom.

In testimony that we claim the invention set forth above we have hereunto set our hands this 13th day of September, 1919.

ANTHONY P. PFEIL.
FREDERICK H. BAUM.

Witnesses:
GEORGE D. RICHARDS,
BARBARA SUTTERLIN.